(12) United States Patent
Rogers et al.

(10) Patent No.: US 9,007,451 B2
(45) Date of Patent: Apr. 14, 2015

(54) SUPER-OSCILLATORY LENS APPARATUS AND METHODS

(75) Inventors: Edward Thomas Foss Rogers, Southampton (GB); Nikolay Ivanovich Zheludev, Southampton (GB); John E Chad, Southampton (GB)

(73) Assignee: University of Southampton, Southampton, Hampshire (GB)

( * ) Notice: Subject to any disclaimer, the term of this patent is extended or adjusted under 35 U.S.C. 154(b) by 359 days.

(21) Appl. No.: 13/415,069

(22) Filed: Mar. 8, 2012

(65) Prior Publication Data

US 2013/0235180 A1 Sep. 12, 2013

(51) Int. Cl.
*G02B 21/00* (2006.01)
*G02B 27/58* (2006.01)

(52) U.S. Cl.
CPC ........ *G02B 21/0084* (2013.01); *G02B 21/0056* (2013.01)

(58) Field of Classification Search
CPC ............................... G02B 21/002; H04N 7/18
USPC ............................................. 348/79; 359/368
See application file for complete search history.

(56) References Cited

U.S. PATENT DOCUMENTS

| 5,105,305 A | 4/1992 | Betzig |
| 6,980,299 B1 * | 12/2005 | de Boer ........................ 356/497 |
| 2009/0084759 A1 * | 4/2009 | MacCrimmon et al. ........ 216/84 |

FOREIGN PATENT DOCUMENTS

WO 2008/009931 1/2008

OTHER PUBLICATIONS

Hecht, B., et al., "Scanning near-field optical microscopy with aperture probes": Fundamentals and applications. Journal of Chemical Physics, 2000. 112(18): p. 7761-7774.
Huang, F. M. and Zheludev, N. I., "Super-resolution without Evanescent Waves". Nano Letters, vol. 9(3), Jan. 30, 2009, p. 1249-1254.
O'Shea, D.C., et al., "Diffractive Optics: Design, Fabrication and Test". SPIE, 2004: p. 39-44.
Robinson, J. and Y. Rahmat-Samii, "Particle swarm optimization in electromagnetic". IEEE Transactions on Antennas and Propagation, 2004. 52(2): p. 397-407.
Kennedy, J. and R. Eberhart, "Particle swarm optimization". IEEE International Conference on Neural Networks Proceedings, vols. 1-6, 1995: p. 1942-1948.
Jin, N.B. and Y. Rahmat-Samii, "Advances in particle swarm optimization for antenna designs: Real-number, binary, single-objective and multiobjective implementations". IEEE Transactions on Antennas and Propagation. 55(3): 2007, p. 556-567.
Baumgartl et al, Applied Physics Letters 98, 181109 (2011).
Mazilu,et al, Opt. Exp., 19(2) 933 (2011).

* cited by examiner

*Primary Examiner* — Christopher S Kelley
*Assistant Examiner* — Matthew Kwan
(74) *Attorney, Agent, or Firm* — Renner, Otto, Boisselle & Sklar, LLP

(57) ABSTRACT

An imaging apparatus is disclosed which uses a super-oscillatory lens to obtain sub-diffraction limit resolution. The super-oscillatory lens is arranged to receive a light beam from a light source, the lens having a pre-defined pattern to spatially modulate the light beam in amplitude and/or phase so that it focuses the light beam to a focus at a first focal point having a full width half maximum of less than half the wavelength. Collection optical elements are arranged to focus the first focal point to a second focal point conjugate to the first focal point. An object for imaging is scanned over the first focal point and a detector is arranged to collect light from a collection region centered on the second focal point.

13 Claims, 12 Drawing Sheets

SUPER-OSCILLATORY LENS APPARATUS AND METHODS

BACKGROUND OF THE INVENTION

The invention relates to super-oscillatory lens apparatus and methods.

The last decade has seen numerous efforts to achieve imaging resolution beyond that of the Abbe-Rayleigh diffraction limit, which proscribes the visualization of features smaller than about half of the wavelength of light with optical instruments. The main direction of research aiming to break this limit seeks to exploit the evanescent components containing fine detail of the electromagnetic field distribution.

Scanning near-field optical microscopy (SNOM) has been well developed since the work of Betzig on optical fiber tips in the early 1990's [1, 2]. Other near-field imaging techniques have also been developed. Near-field imaging techniques exploit evanescent fields so require samples to be positioned very close to a scanning tip which makes the imaging process very difficult to achieve compared with conventional far-field optics.

More recently a proposal has been made by Zheludev, Huang and co-workers for achieving imaging resolution beyond that of the Abbe-Rayleigh diffraction limit away from the near-field by using an optical mask to modulate a spatially coherent optical field in amplitude and/or phase [3]. The optical mask is defined so as to create constructive interference of waves known as super-oscillation. Super-oscillation leads to a sub-wavelength focus in a field of view beyond the evanescent region.

SUMMARY OF THE INVENTION

According to a first aspect of the invention there is provided an imaging apparatus comprising: a light source operable to generate a light beam having one or more wavelength components; a super-oscillatory lens arranged to receive the light beam from the light source, the lens having a pre-defined pattern to spatially modulate the light beam in amplitude and/or phase so that it focuses the light beam to a focus at a first focal point having a full width half maximum of less than half the wavelength; collection optics arranged to focus the first focal point to a second focal point conjugate to the first focal point; a sample holder on which an object for imaging can be arranged; a positioning apparatus operable to move the first focal point relative to the sample holder; and a detector arranged to collect light from a collection region centered on the second focal point.

With the above imaging apparatus it is possible to use a super-oscillatory lens with a sub-diffraction limit sized focus to image an object by scanning the focus at the first focal point over the object, where it will be understood that whether the object is moved or whether relevant parts of the optical assembly are moved, or a combination of both, is a matter of design choice.

The collection region can be sized to collect at least a substantial part of the light from the second focal point. The collection region can be an area having a dimension substantially less than (e.g. less than 80%, 70% or 60% of) the full width half maximum of the second focal point to collect only a part of the light from the second focal point.

It has been established, extremely surprisingly, that the resolution of the image is better than the size of the focus. The normal rule that the resolution is the convolution of the object size and the focus size is therefore violated. For example, when the size of the focus at the second focal point is 185 nm, resolutions of 123 nm and 144 nm have been achieved. The underlying reason for this is not fully understood, but conceptually we can explain it as arising from the fragility of the super-oscillatory focus which relies on the pre-defined patterning across the lens modulating the various components of the light beam in such a way that they collectively form the super-oscillatory focus. If an object obscures only some of these components it could be envisaged that the whole formation of the focus, as well as the formation of the halo surrounding the focus, is significantly disturbed. Namely, when an opaque feature of an object to be imaged obscures a part of the optical field from the super-oscillatory lens, the focus is disturbed.

Another surprising effect that we have found to be significant is that the quality of the image is improved by confining the collection region to exclude some peripheral parts of the focus and only collect light from a central portion of the collection region. We believe this effect relates to the components of the optical field which would normally contribute to forming a relatively intense halo around the focus, this halo being a feature of at least all the binary mask (i.e. pure amplitude modulating) super-oscillatory lenses we have studied. When an object to be imaged obscures the components of the optical field which would normally form the halo, these are scattered into the region of the focus providing essentially a noise contribution on top of the signal from the focus. We believe this is the reason why the quality of the image is improved by confining the collection region to exclude some peripheral parts of the focus.

The apparatus may further comprise an image processing unit operable to assemble an image of the object from an array of picture elements, each picture element having a signal value based on light detected by the detector in one of the collection regions.

The super-oscillatory lens may additionally include a spatial light modulator arranged adjacent to the binary mask and operable to spatially modulate the light beam in phase and/or amplitude.

In some embodiments, the detector is an array detector made up of a two-dimensional array of detector elements, the detector elements having light-sensitive areas which are substantially smaller than the focus at the second focal point. Alternatively, a non-array detector such as a photomultiplier tube or photodiode could be used in conjunction with a pin hole arranged at the second focal point, wherein the pin hole is dimensioned to form the collection region. The pin hole could be provided by a spatial light modulator, for example, a physical sheet of opaque material with a transparent aperture forming the pin hole, or the entrance to an optical waveguide such as a fiber.

The pre-defined pattern can be designed to focus the light beam to create further focuses at further first focal points having full width half maxima of less than half the wavelength, wherein the collection optics also focuses these further first focal points to respective further second focal points conjugate to the respective further first focal points. In this case with multiple focuses it is preferable to use an array detector which is able to collect light in parallel, i.e. simultaneously, from further collection regions centered on the further second focal points.

It is a property of at least the binary mask super-oscillatory lenses that we have designed and fabricated that multiple sub-diffraction limit focuses are formed spaced apart from each other laterally, and also in depth. An object to be imaged can therefore be probed in parallel by the multiple focuses by simultaneously collecting image information from multiple ones of these focuses, thereby speeding up the image acquisition and also reducing errors in stitching individual points together that arise from the mechanical limitations of the accuracy of the positioning apparatus. This approach exploits the unconventional property of super-oscillatory lenses that they tend to have many different focuses. In some senses, this approach could be compared to a confocal imaging technique where multiple beams are scanned over an object in parallel thereby generating multiple focuses on an array detector (which may include a spatial light modulator forming a front-end filter thereto). However, our approach is different from the confocal approach, since in our case a single optical beam illuminating the whole super-oscillatory lens generates the multiple spots (i.e. focuses) on the sample without the need to generate and scan multiple beams over the sample.

In some embodiments, the collection region is a ring-shaped area immediately surrounding the second focal point, but excluding an area centered on the second focal point having a dimension of at least the full width half maximum of the second focal point. The excluded area can have a dimension substantially less than (e.g. less than 80%, 70% or 60% of) the full width half maximum of the second focal point.

There are various options for fabricating the super-oscillatory lens. The super-oscillatory lens can be formed from a binary mask which is generally opaque but is structured with a pre-defined pattern of optically transparent apertures to spatially modulate the light beam in amplitude. The binary mask is typically fabricated with an opaque material supported on a substrate of transparent material, such as a metal on silicon nitride. The substrate may be thinned over the area of the lens so that the lens is a membrane structure. However, it could be envisaged to fabricate a free-standing binary mask of opaque material only. The optically transparent apertures may comprise a plurality of concentric rings and/or a plurality of holes. The super-oscillatory lens optionally additionally includes a spatial light modulator arranged adjacent to the binary mask and operable to spatially modulate the light beam in phase and/or amplitude.

The super-oscillatory lens can be formed from a spatial light modulator which is programmable to provide a pre-defined spatial modulation of the light beam in phase and/or amplitude. Optionally other kinds of spatial modulators could be used, such as the plasmonic mask for combined phase and amplitude modulation proposed by Huang & Zheludev [4].

The detector can be arranged in various different positions depending on the intended application. A detector can be arranged to collect back-scattered light. A detector can be arranged downstream of the focus. A detector may also be arranged in various other configurations, such as to the side of the focus and may also be arranged to avoid collecting unscattered light directly from the focus. Arbitrary combinations of multiple detectors in different configurations may also be used.

The positioning apparatus can be operable to move the first focal point relative to the sample holder such that the first focal point is scanned in a continuous way over an object arranged on the sample holder such that a part of the focus is maintained in intersection with a surface or buried interface of the object.

According to a further aspect of the invention there is provided an imaging method, which may include spectroscopic collection of light, comprising: providing an object to be imaged; providing a light source operable to generate a light beam having one or more wavelength components; arranging a super-oscillatory lens to receive the light beam from the light source, the lens having a pre-defined pattern to spatially modulate the light beam in amplitude and/or phase so that it focuses the light beam to a focus at a first focal point having a full width half maximum of less than half the wavelength; activating the light beam to use the focus at the first focal point to probe a desired location on or in the object; arranging collection optics to focus the first focal point to a second focal point conjugate to the first focal point; scanning the first focal point over the object to probe a plurality of locations (e.g. moving the optical device which forms a scanning head and/or moving the object by moving a platform on which the object is arranged); and collecting light with a detector from a collection region centered on the second focal point (e.g. spectrally reflected light, or light generated as a result of the probe, e.g. by luminescence, and Raman scattering). An image of the object can then be outputted. This method of imaging would be an alternative to scanning near-field optical microscopy (SNOM) for providing sub-diffraction limit resolution. The probe can scan over a portion of the surface of the object, or a part of the interior of the object such as a portion of a buried interface.

DETAILED DESCRIPTION

Figure 1:
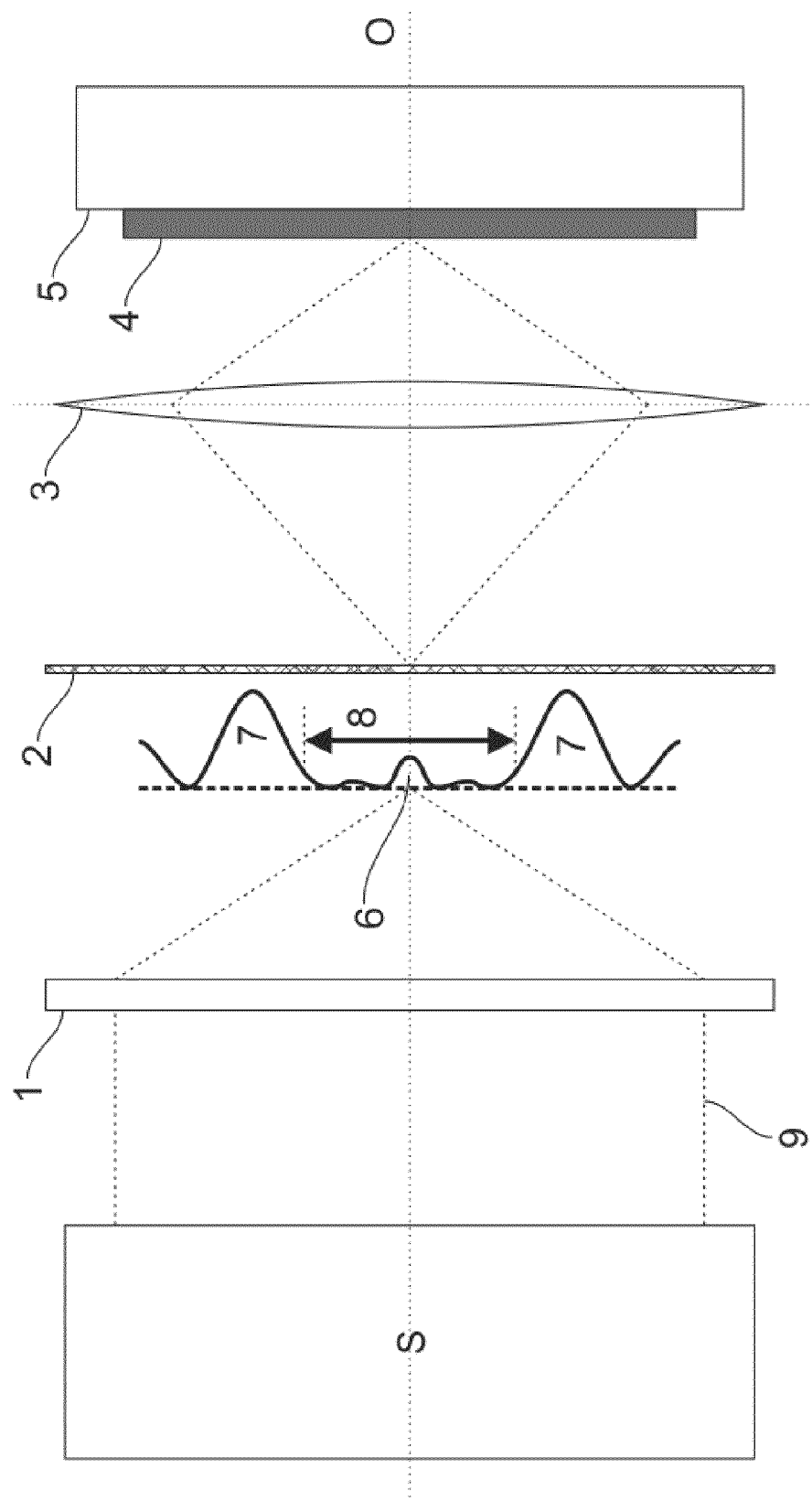
FIG. 1 is a schematic side view of an imaging apparatus according to an embodiment of the invention comprising a super-oscillatory lens.

FIG. 1 is a schematic side view of an imaging apparatus according to an embodiment of the invention. The imaging apparatus can be used as a microscope, for example. The apparatus is shown with a single linear optical axis O for simplicity of description.

A light source S produces a coherent light beam 9. The light beam 9 is assumed to be monochromatic in the description, but in some embodiments a light beam of multiple wavelengths could be used. The light beam 9 is incident on a super-oscillatory lens (SOL) 1 having a pre-defined pattern to spatially modulate the light beam in amplitude and/or phase. The design and manufacture of the SOL is described in detail below. The SOL 1 brings the light to a focus centered on a spot 6 in a focal plane indicated by the dashed line. The intensity profile in the focal plane is also indicated and can be seen to have a peak at the focus 6 and a ring or halo 7 formed by sidebands, the focal spot 6 and halo 7 being separated by a relatively dark annular region of outer diameter 8, where the diameter 8 is the field of view.

The distance along the optical axis O between the SOL 1 and the focal plane can be many wavelengths of light. That is, the focus is not formed in the evanescent region of the SOL, but nevertheless has a sub-wavelength focal size. This focal spot is used to illuminate an object 2 which is arranged in the focal plane. The object 2 is illustrated as being a flat planar structure, but could be of arbitrary shape. (It is noted that the lateral offset in the illustration between the focus 6 and the object 2 is not real, but exists purely to provide space to show the intensity profile in the focal plane.) The image of this object, illuminated by the spot, is relayed by an imaging system 3 comprising suitable collection optics. For example the collection optics can consist of a single lens as illustrated or multiple lenses. The collection optics, in this case single lens 3, focuses light from the focus 7 to a focus on a light sensor 4 of a detector 5, where the focus on the object (the first focal point) is conjugate to the focus on the light sensor (the second focal point).

The detector 5, either physically or electronically, selects only that light that comes from the region in which the focal point 6 is imaged in the absence of the object 2, and thus discards the vast majority of the light that is scattered by the object from the sidebands 7. To build up an image of the object, the spot is scanned relative to the object, and for each position the total light transmitted from the "hotspot", i.e. the focus 6, is recorded, in a manner similar to that used in confocal microscopy. This builds up an image of the object, pixel by pixel. The detector can be a single channel photo-detector such as a p-i-n diode or an array detector, such as a charged couple device (CCD).

Figure 2:
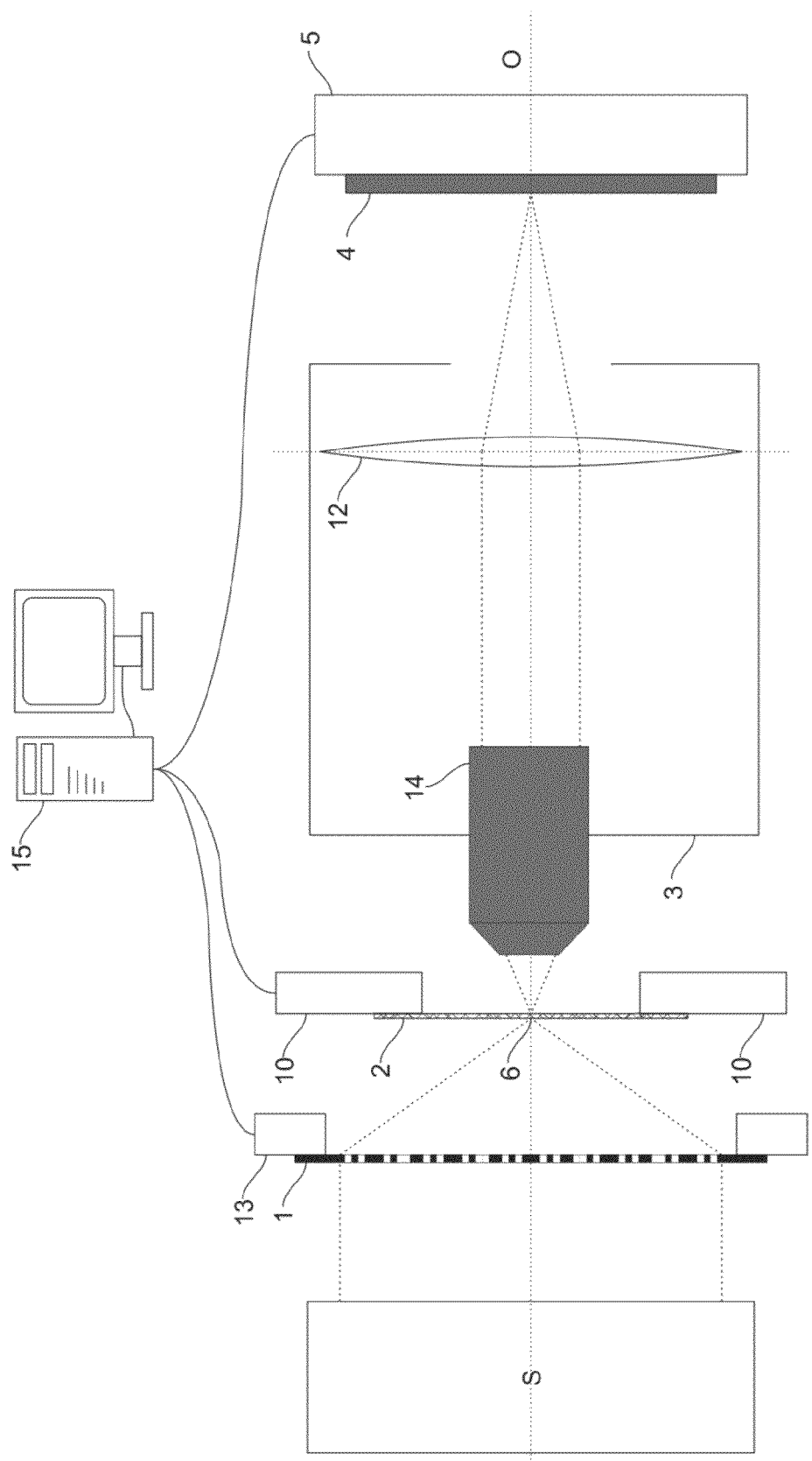
FIG. 2 shows more system details of an implementation according to the embodiment of FIG. 1.

FIG. 2 shows more system details of an implementation according to the embodiment of FIG. 1. Like reference numerals are used for the same elements. The apparatus comprises a binary mask SOL 1 mounted on a lens holder 13 focusing the light beam 9 from the source S onto a first focal point 6 on the object 2 which is mounted on a sample holder 10. The illuminated part of the sample 2 is imaged by a conventional microscope 3 comprising an objective lens 14 and a tube lens 12 onto a detector 5 which may be a CCD camera with a CCD sensor 4. A computer or other electronic control system 15 is used to control a positioning apparatus (not shown), such as x- y- and z-positioners, to move either the lens holder 13 or the sample holder 10 or both to scan the focus 6 across the object 2 and collect an image from the CCD camera 5 for every desired position of the focus on the object. The computer 15 is also used to process the collected image data and display the resultant image.

Figure 3:
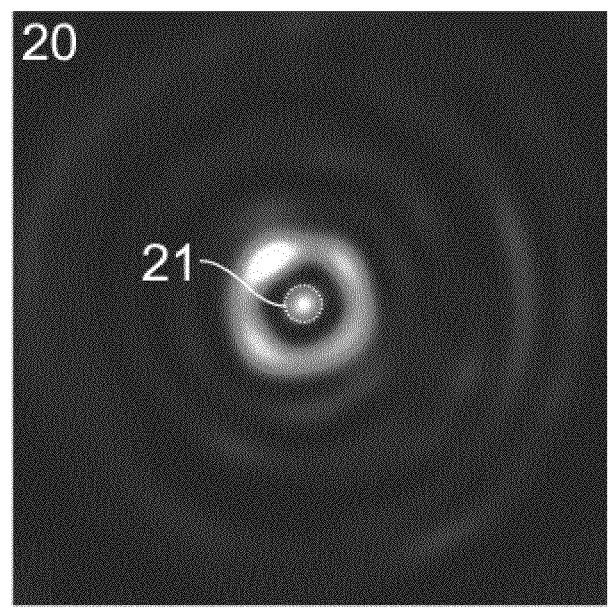
FIG. 3 shows an intensity distribution in the focal plane of a first focal point of an example super-oscillatory lens.

FIG. 3 shows an example intensity distribution in the focal plane for an example super-oscillatory lens. The intensity of a sample spot 20 from the SOL is shown in the absence of an object. The detection area 21 would be centered on the hotspot and with a radius of, for example, ⅓ of the FWHM of the hotspot. The exact choice of radius would depend on the experimental requirements. The pixel value in the image of the object is given by the average intensity, or the sum of intensities, of the pixels within the detection area. For this approach to work accurately, the CCD pixel size must be less than the size of the image of the hotspot projected onto it by the imaging system.

The apparatus can be implemented with light from a wide variety of spatially coherent light sources. For example, any laser source, continuous wave or pulsed, such as a diode laser, a fiber laser, solid state laser, gas laser would be suitable. The only requirement of the light source is that the beam incident on the super-oscillatory lens must be spatially coherent across the surface of the lens. The SOL will normally, although not always, be designed so that a plane wave incident on the surface is focused to a hotspot. In this case, some effort must be made to ensure that the beam incident on the lens has uniform intensity and phase, as is the case with a conventional focusing lens. However, the input aperture of the SOL is typically much smaller (around 40-400 microns) than for a conventional lens (around 3-15 mm). This means that the condition of uniform intensity and phase is more easily fulfilled for this device than for a conventional lens.

Some specific experimental results are now discussed.

Figure 4:
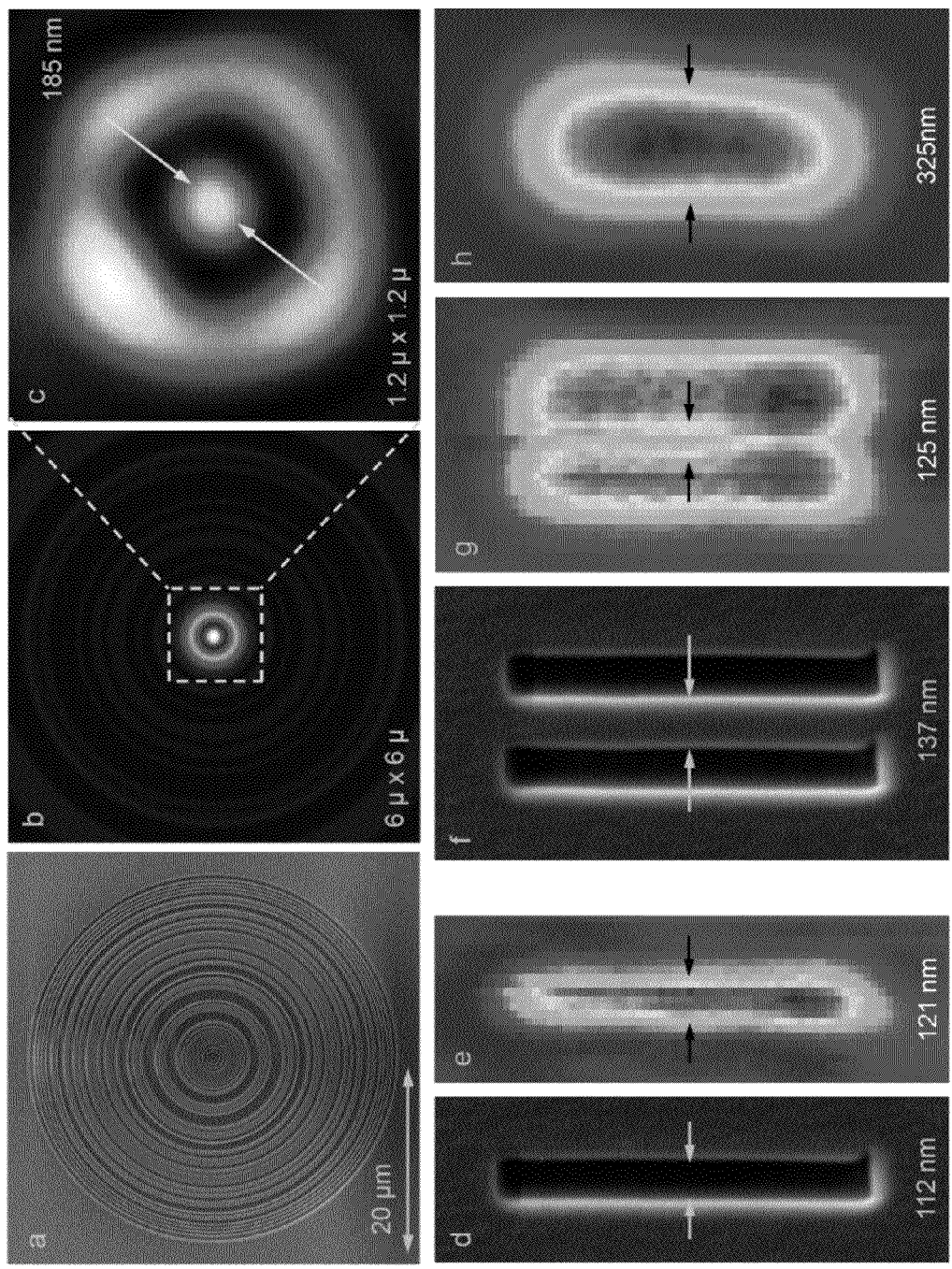
FIG. 4a shows a scanning electron micrograph (SEM) image of an example super-oscillatory lens.
FIG. 4b shows a calculated intensity distribution of the super-oscillatory lens in the focal plane.
FIG. 4c shows a measured intensity distribution in the focal plane of the first focal point.
FIG. 4d is an SEM image of a particular single slit which has a width of 112 nm.
FIG. 4e is a measured intensity distribution of a super-oscillatory lens image of the slit of FIG. 4d.
FIG. 4f is an SEM image of a particular double slit with the slits separated by a distance of 137 nm.
FIG. 4g is a measured intensity distribution of a super-oscillatory lens image of the double slit of FIG. 4f.
FIG. 4h is a measured intensity distribution of a conventional lens image of the double slit of FIG. 4f.

FIG. 4 shows a set of images of example sub-wavelength imaging with a super-oscillatory lens.

FIG. 4a shows an SEM image of the example SOL which is a circular ring-structure binary mask with the ring structure extending over a radius of approximately 20 micrometers.

FIG. 4b shows a calculated energy distribution of the super-oscillatory lens at a distance along the optical axis of 10.3 μm where a focus is formed. The image is over a square area of 6×6 micrometers around the focal point of the SOL of FIG. 4a.

FIG. 4c shows a measured intensity distribution over a square area of 1.2×1.2 micrometers around the focal point of the SOL of FIG. 4a. The light beam has a wavelength λ=640 nm. An intensity distribution similar to that shown schematically in FIG. 1 can be seen in which a central spot has a dark ring around it followed radially outwards by a bright ring corresponding to the sidebands. The central focus has a diameter of only 185 nm.

FIG. 4d is an SEM image of a particular single slit which has a width of 112 nm.

FIG. 4e is a measured intensity distribution of a super-oscillatory lens image of the slit of FIG. 4d. The light beam has a wavelength λ=640 nm. The slit feature in the image has a width of 121 nm, close to the actual slit width of 112 nm.

FIG. 4f is an SEM image of a particular double slit with the slits separated by a distance of 137 nm.

FIG. 4g is a measured intensity distribution of a super-oscillatory lens image of the double slit of FIG. 4f. The light beam has a wavelength λ=640 nm. The slit gap in the image has a width of 125 nm, slightly smaller than the actual slit gap.

FIG. 4h is a measured intensity distribution of a conventional lens image of the double slit of FIG. 4f where the conventional lens has a numerical aperture NA of 1.4. It is evident that the double slit is not resolved in this case. The light beam has a wavelength λ=640 nm so the conventional diffraction limit is 320 nm which is close to the measured feature size of the image formed of the double slits which is 325 nm.

Figure 5A:
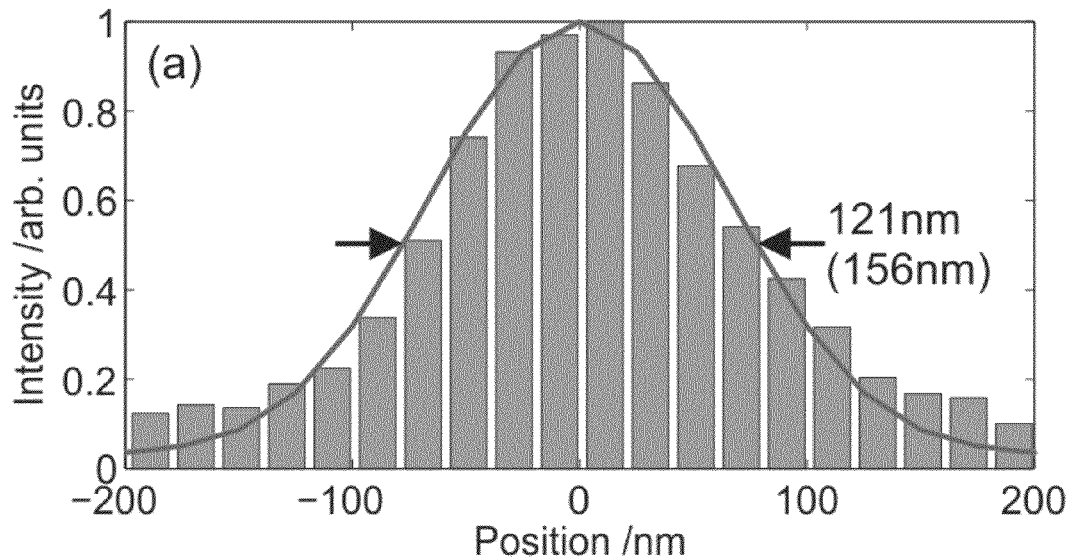
FIGS. 5a and 5b show a comparison of experimental and theoretical responses of the super-oscillatory imaging examples shown in FIGS. 4e and 4g.
Figure 5B:
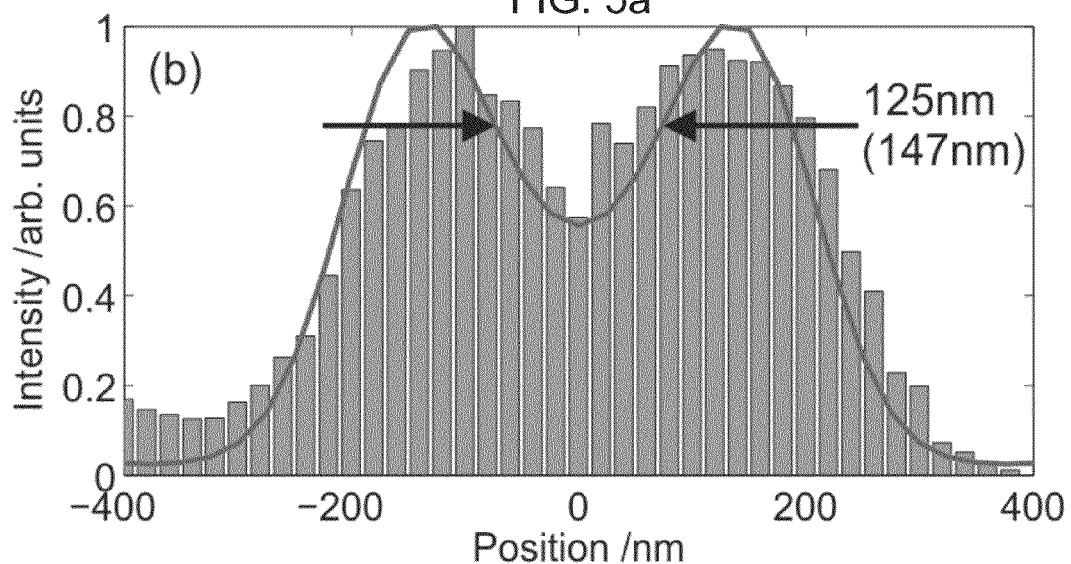

FIGS. 5a and 5b show a comparison of experimental and theoretical responses of the super-oscillatory imaging examples shown in FIGS. 4e and 4g. The bars show the experimentally recorded cross-section of the SOL images. The solid line curves show the modeling results.

FIG. 5a relates to the single slit image presented in FIG. 4e. The half width of the single slit obtained from the experimentally obtained image is 121 nm.

FIG. 5b relates to the double slit image presented in FIG. 4g. The gap between the two slits determined from the experimentally obtained image is 125 nm, similar to the corresponding computed value of 147 nm.

In other words, in both cases the actual images have significantly better resolution than the 185 nm spot size.

To demonstrate the imaging process we have imaged nanostructured objects with a binary ring mask SOL. A ring pattern of the SOL (FIG. 4a) with outer diameter 40 µm was manufactured by focused ion-beam milling of a 100 nm thick aluminum film supported on a round glass substrate and mounted as a microscope illuminating lens. When illuminated with a laser at λ=640 nm, it generates a focal hot-spot 185 nm in diameter that is located at a distance of 10.3 µm from the film (FIGS. 4b,c). The intensity of light in the SOL hot-spot was ~25 times the intensity of the incident light. The sample was illuminated with the SOL installed in place of the conventional immersion microscope lens. Imaging experiments were performed with a Nikon dual microscope. A single-longitudinal-mode diode laser operating at 640 nm was used as a source. The transmitted signal was recorded on a CCD through a Nikon immersion microscope lens model VC100xH. We used a fast frame rate 16-bit resolution 5 megapixel Andor Neo sCMOS camera. The object was scanned with 20 nm step across the spot using a X-Y nano-precision piezo stage. To construct the image, the detection zone was chosen to be factor of 3 smaller than the hot-spot image on the CCD. The image is reconstructed in a simple point-to-point consecutive scanning process without any deconvolution or post-processing, so no prior information about the sample is required or assumed.

As test objects to demonstrate optical resolution we used single and double nano slits manufactured in a 100 nm titanium film (see FIG. 4). A single slit 112 nm wide is seen by the SOL as a 121 nm slit (Gaussian fit). A 137 nm gap between two slits is well resolved and seen as a 125 nm gap (double Gaussian fit). These slits are not resolved by a conventional liquid immersion lens with NA=1.4 (FIG. 4h). These measurements demonstrate resolution of better than Δ≈140 nm, or λ/4.6.

To further illustrate the experimentally demonstrated resolution, we compared recorded images with those obtained by computer modeling using the angular spectrum method. Modeling returned the focal spot of the SOL to be 185 nm in diameter, which agrees with the experimentally observed value (see FIG. 4c). A comparison between simulated and experimentally recorded images is presented in FIG. 5. It demonstrates a very good agreement in resolution and shape, where discrepancies are mainly due to the pixelation and CCD noise.

FIGS. 6a-f are a series of images of a complex structure taken with the super-oscillatory imaging technique. Each image is over a square area of 2.75 µm×2.75 µm.

Figure 6:
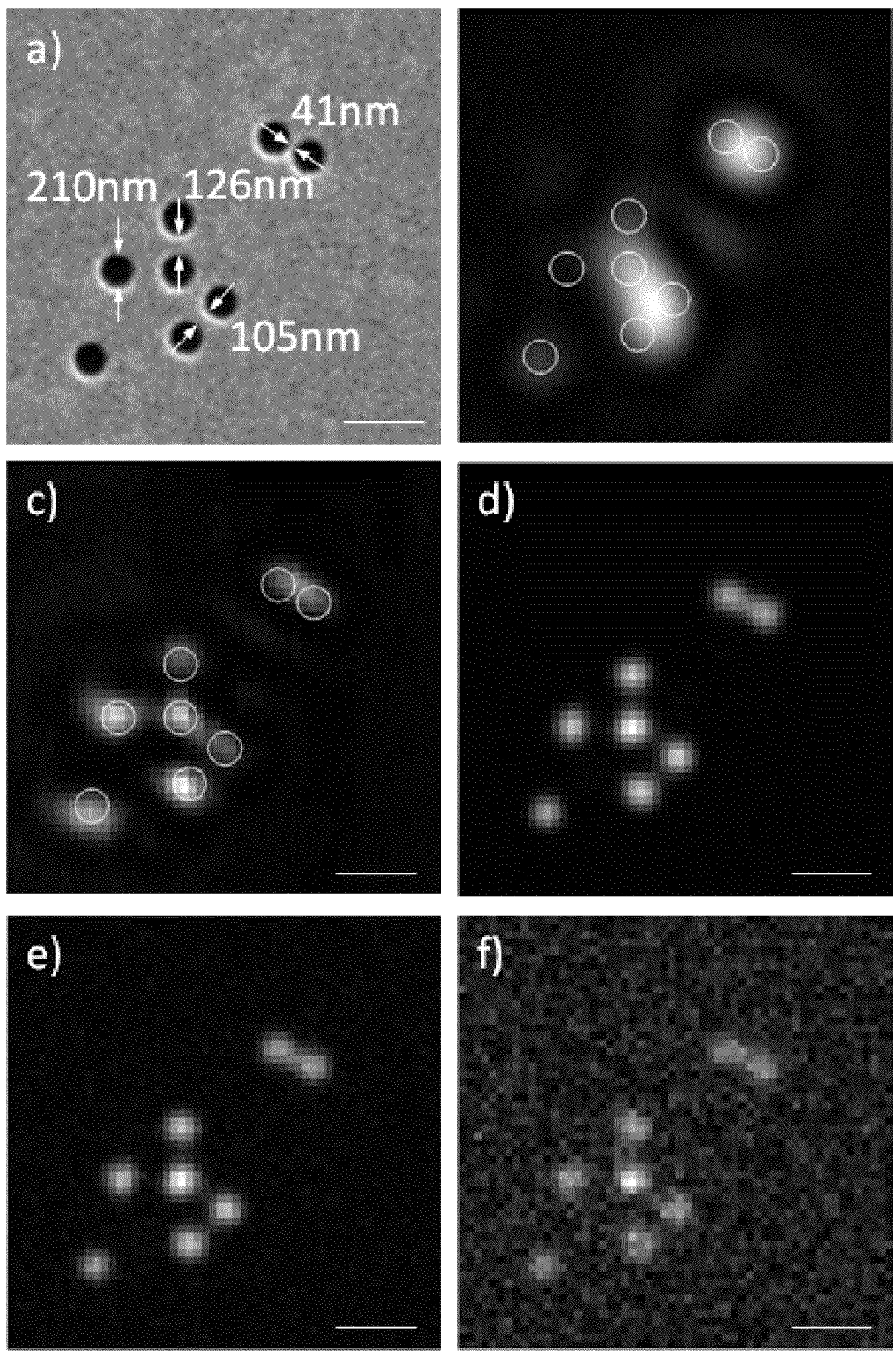
FIGS. 6a-f are a series of images of a complex structure taken with the super-oscillatory imaging technique.

FIG. 6a is an SEM image of the complex structure. The complex structure is a cluster of eight approximately circular nanoholes in a 100 nm gold film arranged in arbitrary positions with widely varying hole separations. This complex structure was imaged to demonstrate the ability of the super-oscillatory lens to image complex objects.

FIG. 6b is a conventional image of the cluster taken with a conventional lens of NA=1.4. The individual nanoholes are blurry and not resolved.

FIG. 6c is an SOL image of the cluster which resolves all the individual nanoholes except the pair which is closest, i.e. the holes in the top right of the image that are separated only by 41 nm. Dashed circles map the positions of the holes. With the super-oscillatory lens most major features of the cluster appear sharply and are resolved. The holes separated by 105 nm (λ/6) are seen clearly distinct and separated. The two holes spaced by 41 nm (λ/15) are nearly resolved. This image indicates that scattering from the halo sidebands into the detection area is not a significant problem due to its small area and results in just visible halos around the imaged nanoholes. For FIG. 6c, the dark field noise level was about 0.003 of the hot-spot peak signal.

To investigate the effect of noise on image reconstruction, we simulated adding increasing levels of noise on the confocal detector, thus modeling a situation when a noisy laser is used or a less intense super-oscillatory hot-spot is used as the focus to be imaged from.

FIG. 6d is a simulated SOL image of the cluster under zero noise conditions. It maps well onto the SEM image of FIG. 6a and the experimentally recorded SOL image of FIG. 6c. Small discrepancies exist which are due to mechanical drifts in the microscope system during the scanning process, which took about 600 seconds for the 2.75 µm×2.75 µm sample area.

FIGS. 6e and 6f are further simulations in which normally distributed detector and/or laser source noise of respectively 2 and 10 percent of the peak hot-spot signal has been added. These simulations show the robustness of the imaging technique against noise from the source or detector, since even with 10 percent noise the nanoholes are still resolved, and with 2 percent noise the image is not perceptibly degraded compared with the zero noise image. The main effect of noise appears to be the reduction of the contrast in the image. Scattering from the sidebands into the detection area is seen not to be a significant problem, which we believe is due to the small detection area. This scattering is just visible in FIG. 6c as a very weak halo around the imaged nanoholes.

We now consider the design of a specific type of SOL, consisting of a series of concentric rings. The area outside the nanolens is assumed to be opaque. Similar techniques could be applied to other structures.

We consider a radially symmetric binary-amplitude mask located at the plane z=0, which is illuminated by a monochromatic (wavelength λ) plane wave propagating in the z direction.

The structured region is divided into N unit cells (pixels), i.e., concentric annuli, where each pixel has either unit or zero transmittance. The field at any plane z>0 can be calculated using the angular spectrum method (see e.g. [5]) as $$U(r,z) = 2\pi \int_0^{1/\lambda} A(\rho) e^{i\sqrt{k^2 - 4\pi^2 \rho^2} z} J_0(2\pi \rho r) \rho \, d\rho$$

where we consider only the propagating waves with $\rho \leq 1/\lambda$. Here $A(\rho)$ is the angular spectrum at z=0, $\rho$ is the transverse spatial frequency, k is the wavenumber, and $J_0$ denotes the zero-order Bessel function.

The angular spectrum for an annulus, i.e., a single pixel with unit transmittance, with the inner radius $R_i$ and the outer radius $R_o$ is $$A(\rho) = R_o \frac{J_1(2\pi R_o \rho)}{\rho} - R_i \frac{J_1(2\pi R_i \rho)}{\rho}$$

where $J_1$ denotes the first-order Bessel function.

The transmitted field from each individual pixel at a specified distance z>0 is stored into a database, which enables fast evaluation of the total field at the focus as a superposition of the field from each pixel weighted by the corresponding pixel transmittance (0 or 1). The mask profile, which is represented by a N-bit binary string, is optimized using the binary particle swarm optimization (BPSO).

Particle swarm optimization (PSO) [6, 7, 8] is a nature-inspired evolutionary algorithm for stochastic optimization. In PSO algorithm the swarm consists of a certain number of particles, which move in the N-dimensional search space to find the global optimum.

Each particle represents a possible solution to the design problem. The quality of the particles is defined by a merit function and the movement of the particles is guided by the global best position $g_j$ (j=1, . . . , N), the best value attained by the whole swarm, and the personal best position $p_{ij}$, the best value attained by the individual particle i.

In BPSO [8] the position of each particle is represented by a binary vector of length N. The particle velocity is a real vector of length N with values in $[-V_{max}, V_{max}]$ where $V_{max}$ is the maximum velocity. In BPSO the velocity vector gives the probability of the bit change in the position vector update. The initial swarm is generated with random starting positions and velocities. The update of the velocity vector for the particle i given by $$v_{ij}^{t+1} = v_{ij}^t + c_1 r_1 (p_{ij}^t - x_{ij}^t) + c_2 r_2 (g_j^t - x_{ij}^t)$$

where t is the iteration counter, $c_1$ and $c_2$ are constants, and $r_1$ and $r_2$ are random numbers in (0,1). The sigmoid transformation $S(v) = [1+\exp(-v)]^{-1}$ is used to map the velocity v to a subset of (0, 1) and the particle position is updated as $$x_{ij}^t = \begin{cases} 1, & r_{ij}^t < S(v_{ij}^t) \\ 0, & r_{ij}^t \geq S(v_{ij}^t) \end{cases}$$

where $r_{ij}^t$ is a random number in (0, 1). The PSO parameters have been chosen as $c_1 = c_2 = 2.0$ and $V_{max} = 6.0$.

We define the merit function, which we aim to minimize, as the full-width at half maximum (FWHM) of the central spot in the radial intensity profile. Furthermore, we constrain the solution space by requiring the usable field of view (FOV) and the intensity ratio of the central peak and the maximum side lobe to have experimentally feasible values.

We define the FOV is as the distance from the origin r=0 to the point where the side lobe intensity gets above 20% of the central peak intensity and require the FOV to be at least 1.2 wavelengths, which should be sufficient to filter out the side lobes in the sub-wavelength imaging applications. Furthermore, we require the intensity ratio to be higher than 0.05.

Typical parameters for our use of BPSO to design a nano-structured mask are an overall mask radius of 20 microns. The structured region is typically divided into N=100 rings. Typically we use a swarm of 60 particles and 10000 iterations.

Figure 7:
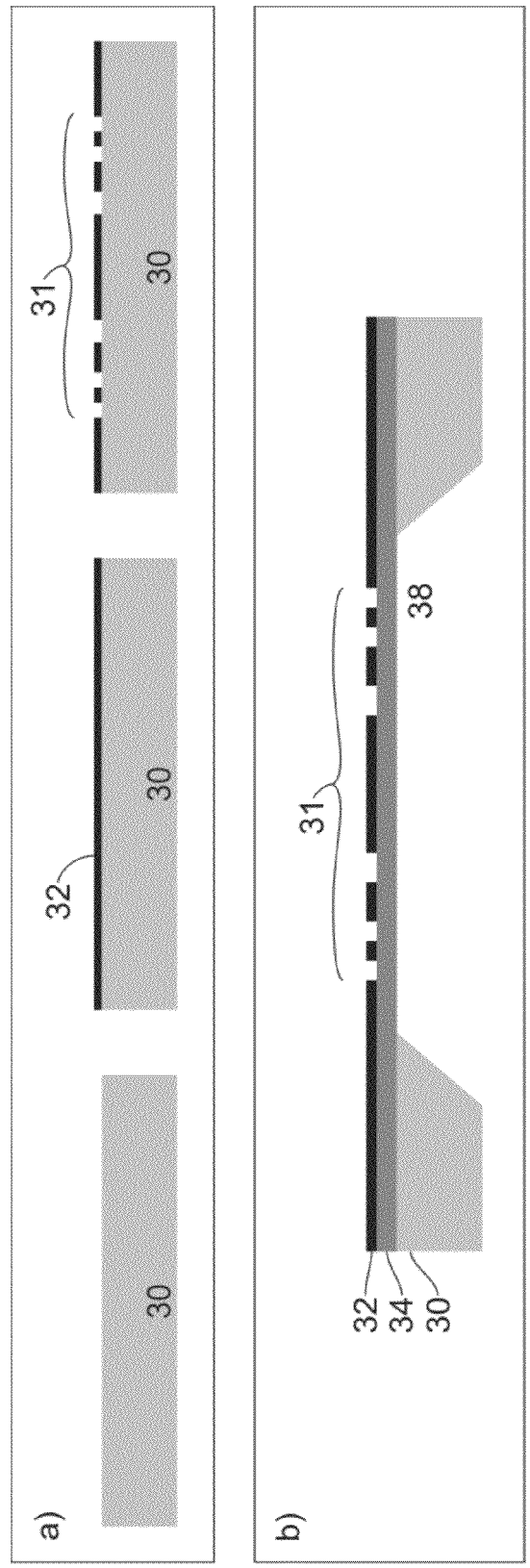
FIG. 7a shows a manufacturing process for fabricating a binary mask super-oscillatory lens.
FIG. 7b shows a variant of the manufacturing process.

FIG. 7a is a series of three schematic sections showing a manufacturing process for fabricating a binary mask SOL onto a substrate 30. A metal film 32 is deposited on the substrate 30 and patterned using focused ion beam milling to produce a binary mask 31. The metal layer is for example 50-100 nm thick. The metal can be deposited by electron beam vapor deposition or thermal evaporation.

The substrate could be any material transparent to the wavelength of light being used; possible options include: silica, quartz, silicon nitride, or any other suitable glass. The mask could be formed of any material that is opaque to the wavelength of light being used and can be deposited in a thin film; possible options include: gold, aluminum, titanium, chromium and many other metals.

FIG. 7b shows a variant in which an additional silicon nitride layer 34 is formed on the substrate 30 before depositing the metal layer 32 membrane. The silicon nitride layer 34 provides an etch barrier which allows back etching of the substrate 36 so that the binary mask 31 can form a membrane 38 with the adjacent portion of the silicon nitride layer 34. Suitable silicon nitride is commercially available: see, for example, www.silson.com. The binary mask 31 is thus left effectively free standing, allowing access to both sides of the mask.

In different embodiments, the structured area of the super-oscillatory lens could be structured in a number of ways to achieve the formation of a binary mask. The structured area could be formed by a series of concentric rings. Other alternatives include holes arranged in random, semi-random, quasi-periodic or periodic patterns. The holes could have any shape, and need not necessarily be round. The holes may all be the same size or may vary in size.

By way of example only, FIGS. 8a to 8f illustrate six example binary mask SOLs to provide a visual impression of the amount of variety in the patterning that is possible. The patterning of the structured area varies considerably between the different examples. The scale bar is 10 μm long in all images.

Figure 8:
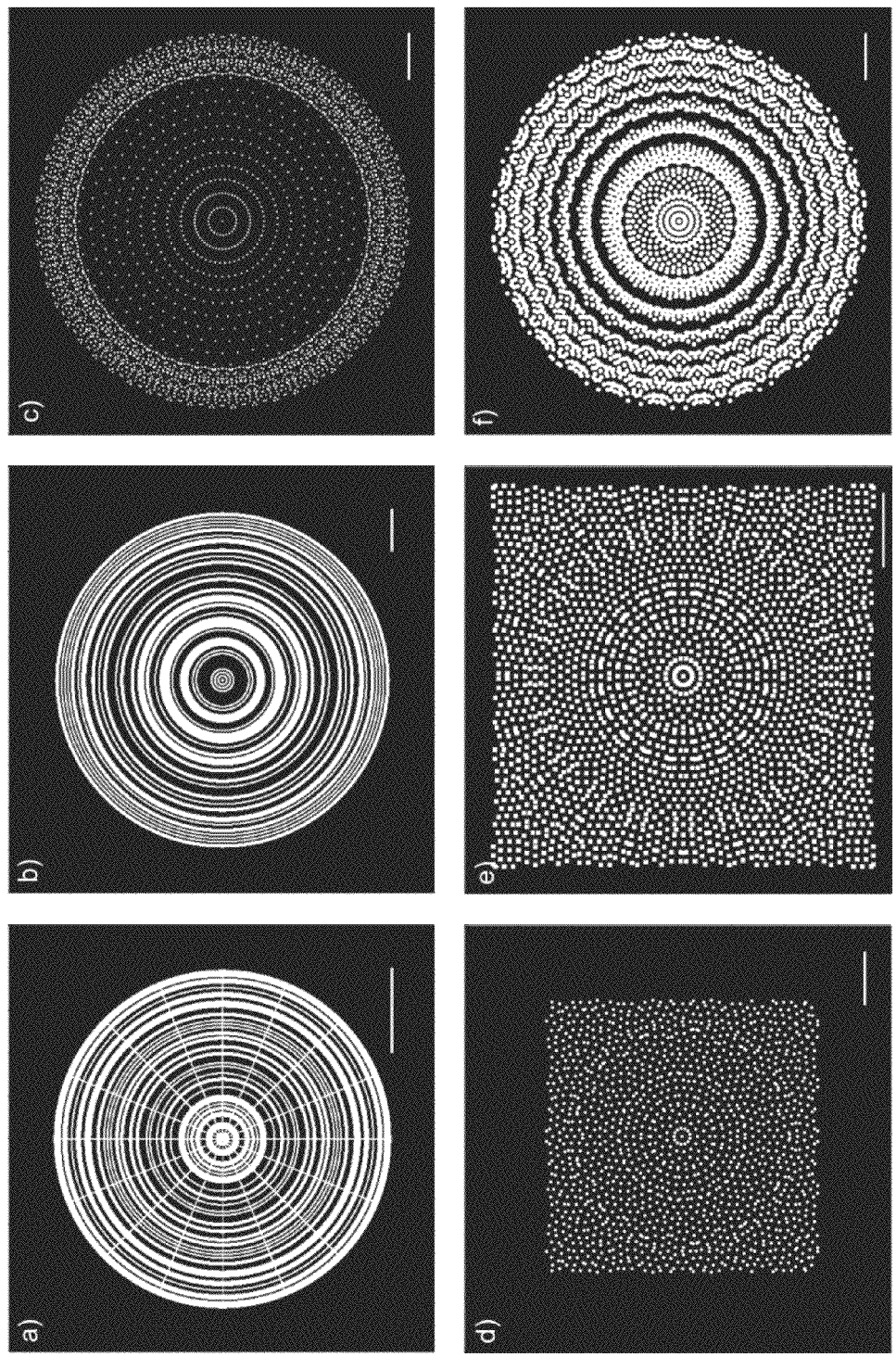
FIGS. 8a to 8f illustrate six example binary super-oscillatory lenses.

FIG. 8a shows a mask formed of concentric rings, supported by spokes to ease fabrication. This indicates that the circular symmetry of the mask is not essential.

FIG. 8b shows a mask of concentric rings.

FIG. 8c shows a circular 27-fold symmetric quasi-periodic array of small round holes.

FIG. 8d shows a square 13-fold symmetric quasi-periodic array of small round holes.

FIG. 8e shows a square 20-fold symmetric quasi-periodic array of square holes.

FIG. 8f shows a circular 13-fold symmetric quasi-periodic array of large holes. In this case the holes overlap considerably.

Figure 9:
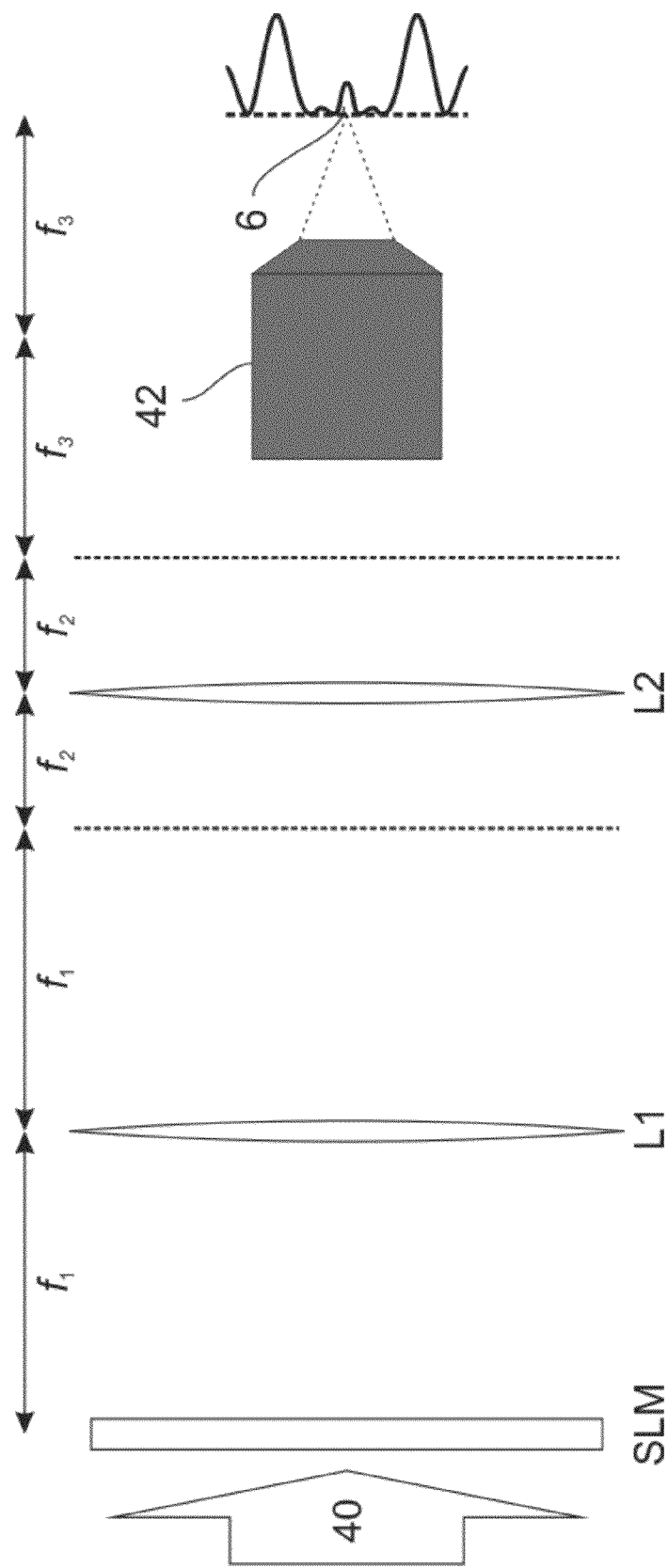
FIG. 9 is a schematic side view of an embodiment in which the super-oscillatory lens is formed by a spatial light modulator.

FIG. 9 is a schematic side view of an embodiment in which the super-oscillatory hotspots are created using a spatial light modulator (SLM). The SOL 1 is formed from an SLM and a system of lenses to transform the pattern displayed on the SLM into a sub-wavelength focal spot—see for example Baumgartl et al. 2011 [9] and Mazilu et al. 2011 [10]. This implementation of the composite SOL for focusing can be used for imaging in the same way as with a binary SOL; only the focusing element is changed. One possible optical arrangement is illustrated in FIG. 9. An incoming coherent light beam 40 is modulated by the SLM and demagnified and Fourier transformed by the combination of the lenses L1, L2 (with focal lengths $f_1$ and $f_2$) and the microscope objective 42 (with focal length $f_3$) to form a subwavelength focal spot 6. It should be noted that the image is not to scale and typically $f_3<f_2<f_1$. The illustrated SLM works in transmission, but reflective SLMs could also be used.

In other embodiments, a spatial light modulator can be used in combination with a binary mask, for example using the SLM to augment the performance of the binary mask. In this case, the SLM would be positioned before the binary mask, with an optical system between the SLM and the binary mask to transfer and transform the pattern displayed on the SLM onto the surface of the binary mask. The combination of the phase and/or amplitude modulated input beam with the binary mask will produce a focal spot that can be used for imaging as described above.

An additional option would be to use a SOL capable of producing N multiple, spatially separated hotspots in the plane of the sample. Each of these will be imaged to different points on the detector, and, if the detector is a CCD or other array detector, can be captured simultaneously. For this to work the hotspots must be separated from each other and any sidebands by at least the resolution limit of the imaging system. If one detection area is assigned to each hotspot, then an image can be built up N pixels at a time, and the distance over which the object needs to be scanned is reduced from the full area to be imaged to the distance between the hotspots. This allows the option of parallel image acquisition, significantly speeding up the imaging process.

As the imaging system has a limited depth of focus, multiple images can be taken at different focal planes in the z-direction (the direction of beam propagation) by moving the object to different heights, as in standard microscopy. This allows the possibility of 3 dimensional imaging by building up a set of images acquired at fixed offsets in the z-direction. This is sometimes referred to in the art as z-stacking.

In the examples above, it has been assumed that the image is built up from light transmitted by the object. It is also possible to use light emitted by the object as a result of excitation by the incoming beam. This light could be created by fluorescence, nonlinear wavelength conversion, Raman scattering, harmonic generation etc. Spectrally resolved detection is also possible by using a pinhole in the detector plane as the detection area and collecting the light coming through the pinhole and transmitting it to a spectral resolved detector.

The implementation described above shows a transmission imaging geometry, however, it would also be possible to use place the imaging system on the same side of the sample as the focusing lens. This would be easily applicable to the SLM-based SOL, but could also be envisaged for a binary SOL if the SOL was placed in the center of the microscope objective used in the imaging system. As the SOL is small it should not adversely affect the imaging system dramatically.

An additional option for detection is to use a pinhole in the detector plane with a single channel detector such as a photomultiplier or avalanche photodiode to collect the light passing through the pinhole. The pinhole could be formed in any opaque sheet and would have a size similar to the physical size of the detection region used in the CCD implementation. This could allow for faster acquisition times.

As well as imaging, there are additional applications of the confocal imaging technique.

Figure 10:
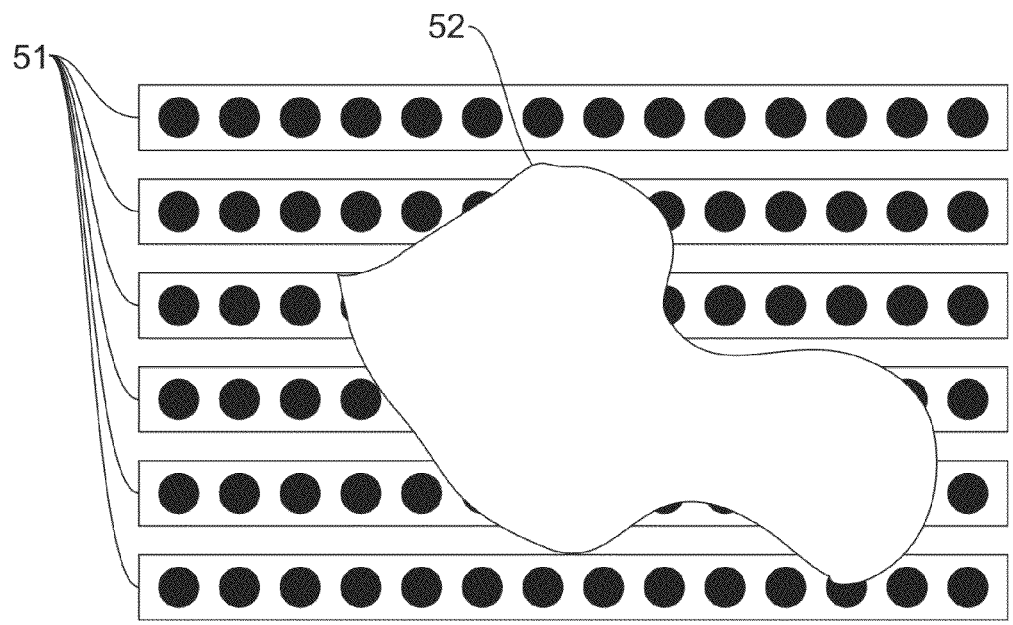
FIG. 10 is a schematic illustration for describing how a confocal imaging apparatus embodying the invention can be used as a metrology system.

FIG. 10 shows how the confocal imaging apparatus can be used as a metrology system or nanoruler. In this system, an object to be measured 52 is placed on a nanostructured surface an array of markings. In this case arrays of circular holes 51 are depicted, but the marking could be of any shape and size that is resolvable using the confocal imaging arrangement. To measure the object in any direction, the object and nanostructured surface are scanned in through the spot in an arrangement similar to FIG. 2 and the holes at each position are registered as either visible or not. To determine the size of the object, the number of obscured holes in the x or y direction is counted i.e. if the holes are at 100 nm pitch, and 5 holes are obscured, then the object measures 500 nm in the direction of measurement.

The technique can also be used as a mask aligner in lithographic fabrication. A conventional photomask aligner uses two microscopes (one at each side of the mask/wafer) to image a photomask and wafer whilst positioning the mask in the correct position above the wafer. The confocal imaging system disclosed herein may also be used to replace the conventional microscope objectives in a conventional photomask aligner system. This would allow mask alignment with sub-wavelength accuracy. As SOL systems tend to be highly sensitive to sharp edges, it would be well suited for locating standard alignment marks on conventional photomasks. The optical arrangement would be the same as shown in FIG. 2.

The imaging technique can also be used for an optical memory read head.

Figure 11:
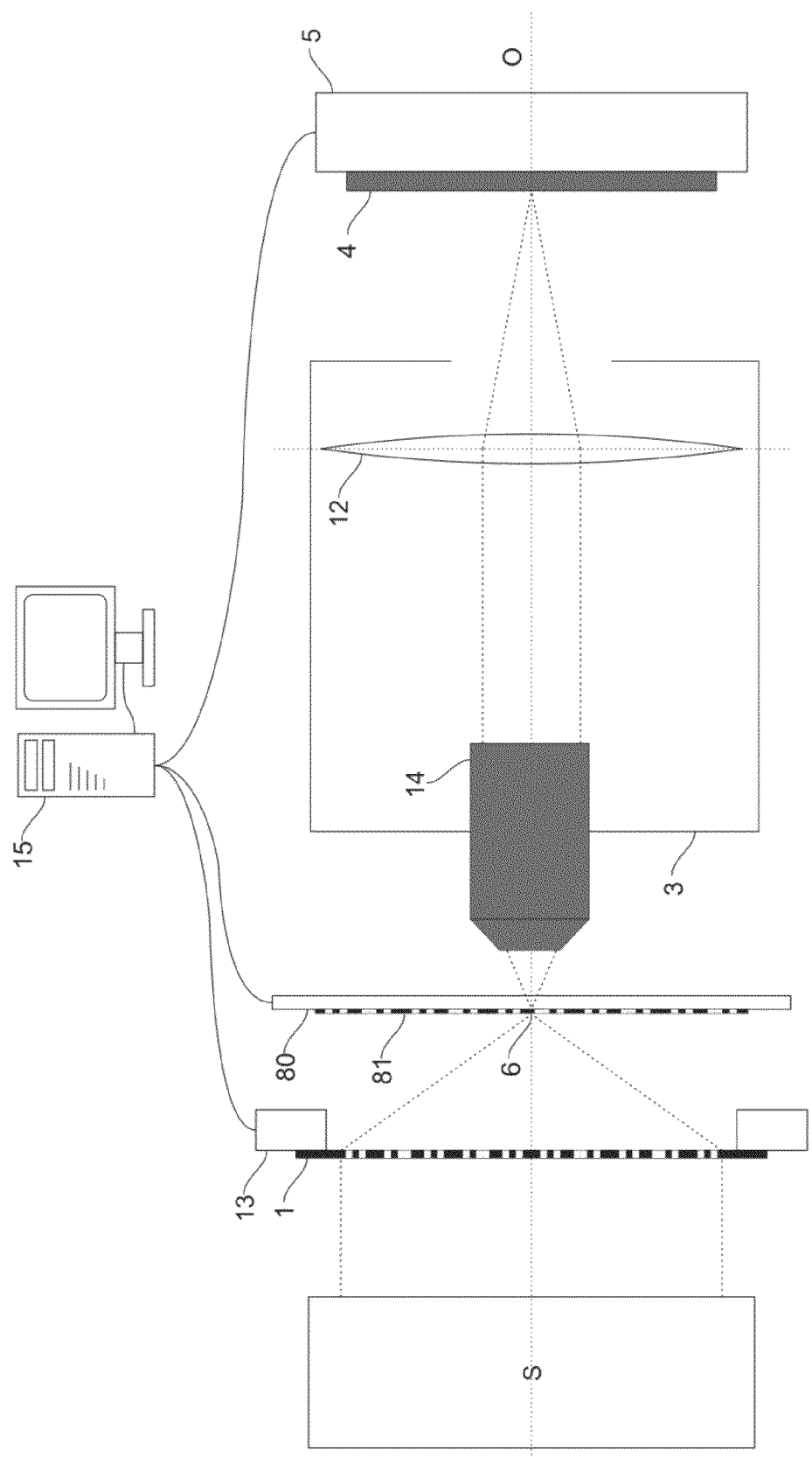
FIG. 11 shows a super-oscillatory lens system for reading from an optical memory.

FIG. 11 shows a system for reading optical memory based on the same optical setup as the imaging system in FIG. 2, where like reference numerals are used for corresponding features. FIG. 11 shows a transmission geometry, but as with the imaging system the system could also be envisaged to work in reflection.

The object to be imaged is an optical memory surface 81 mounted on a substrate 80. Instead of moving the object in two dimensions and recording the image, the object is moved in one dimension, moving the spot over a memory track, and the total signal in the detection area is recorded by the computer 15 as a function of position. Image processing is carried out by the computer 15 by binning the measured intensity over the size of each pit to provide a single value or number for the transmission (or reflection) of each pit. These single values are then digitized to obtain the digital value for each pit. This is done by comparing the transmission or reflection intensity value to a threshold value, with values greater than the threshold being equivalent to a binary 1, and values less than the threshold being binary 0. The data borne on the optical memory is thus read.

Figure 12:
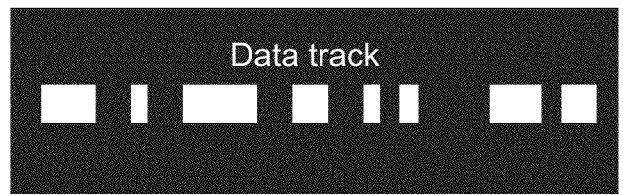
FIG. 12 shows example binary data to be read from an optical memory.

FIG. 12 shows an example 4-byte binary series to be read, which can be considered to be an example fragment of a much longer memory track on an optical memory. To demonstrate the ability to read data from an optical memory, such as from pits in a compact disc, or crystal and glass portions on the surface of a phase change memory, we simulated the performance of the method described on this 4-byte binary series, namely [01110010 01111001 10010100 00111011]. The series is written into an opaque film as a series of lines, of width 160 nm ($\lambda/4$) in the read direction, with a transmitting line corresponding to a one, and an opaque line corresponding to a zero.

FIGS. 13A to 13D show simulated results of this method as applied to the data track of FIG. 12.

Figure 13A:
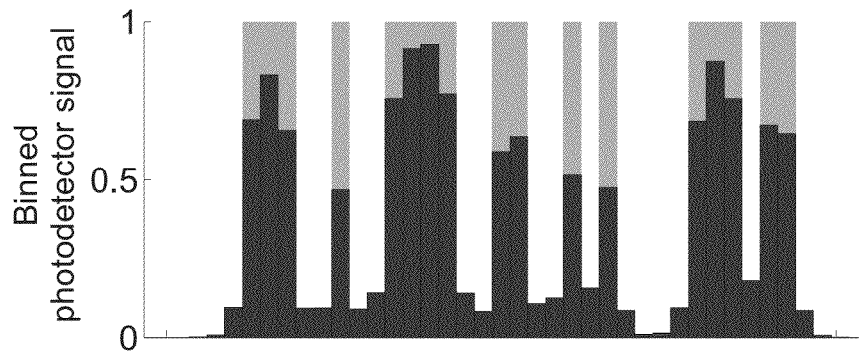
FIGS. 13A and 13B show simulated results from reading the example data of FIG. 12 with the system of FIG. 11.
Figure 13B:
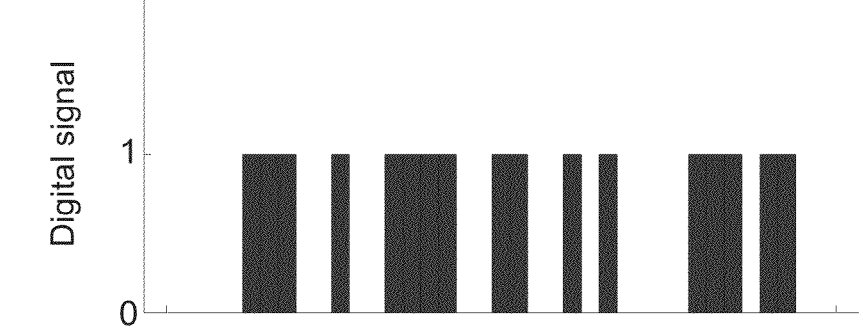
Figure 13C:
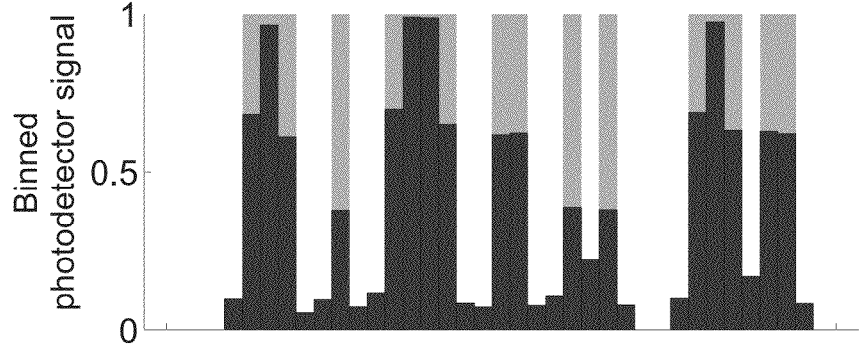
FIGS. 13C and 13D show simulated results from reading the example data of FIG. 12 with an alternative conventional system.
Figure 13D:
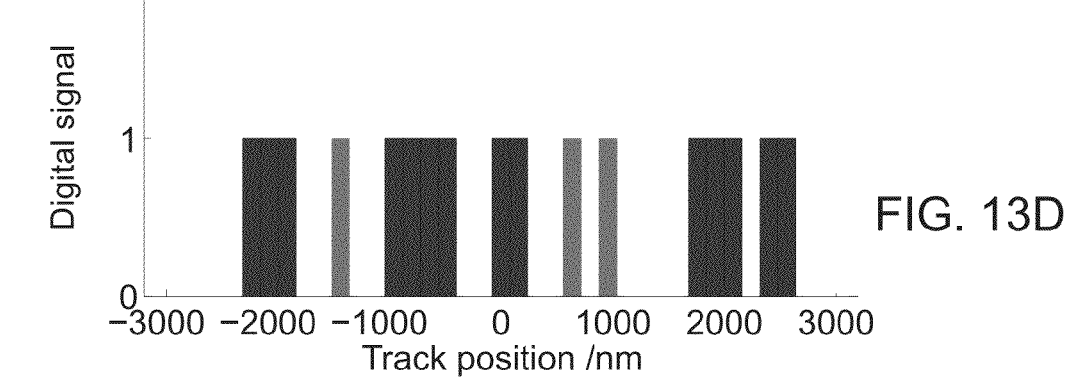

FIGS. 13A and 13B show the results using scanning with a super-oscillatory lens, i.e. using the system shown in FIG. 11. FIGS. 13C and 13D shows the results using scanning but with a conventional objective as the focusing lens by way of comparison. FIGS. 13A and 13C show the respective binned detector signals recorded above each pit, with the grey bars showing the position of the transmitting lines. FIGS. 13B and 13D show the respective digitised signal, with bit errors indicated by the red bars. The simulated imaging is carried out using a 1.4 NA objective in immersion oil at a wavelength of 640 nm. The threshold value is chosen to be 0.4 times the maximum transmission of a memory cell.

In FIG. 13B, we see perfect correspondence between the SOL imaged data with a pitch of $\lambda/4$ and the original data and the lowest value in a bit corresponding to 1 ($min_1$) is a factor of 3 bigger than (the highest value intensity value in a pixel corresponding to 0) ($max_0$), meaning that the choice of threshold level is not crucial and the system has a large error margin.

In FIG. 13D, we see that a conventional focusing objective does not retrieve the binary data correctly, and $min_1$ is only 1.7 times $max_0$. This means that although the data could be retrieved with a correct choice of threshold, the choice is much more crucial than in the SOL case, and the noise margin in the system is a factor of two lower.

Current blu-ray discs use pits of 150 nm and a tack pitch of 320 nm, and are read using a laser with 405 nm wavelength. If the example method of FIG. 13B were scaled to a wavelength of 405 nm, it would have a pit length 100 nm and a pitch of 200 nm, giving a storage density improvement of a factor of two.

It is therefore demonstrated that the confocal imaging approach with a super oscillatory lens can be used to read optical memory cells with a significantly sub-wavelength feature size.

The super-oscillatory lens can also be integrated with an optical fiber as now described.

Figure 14:
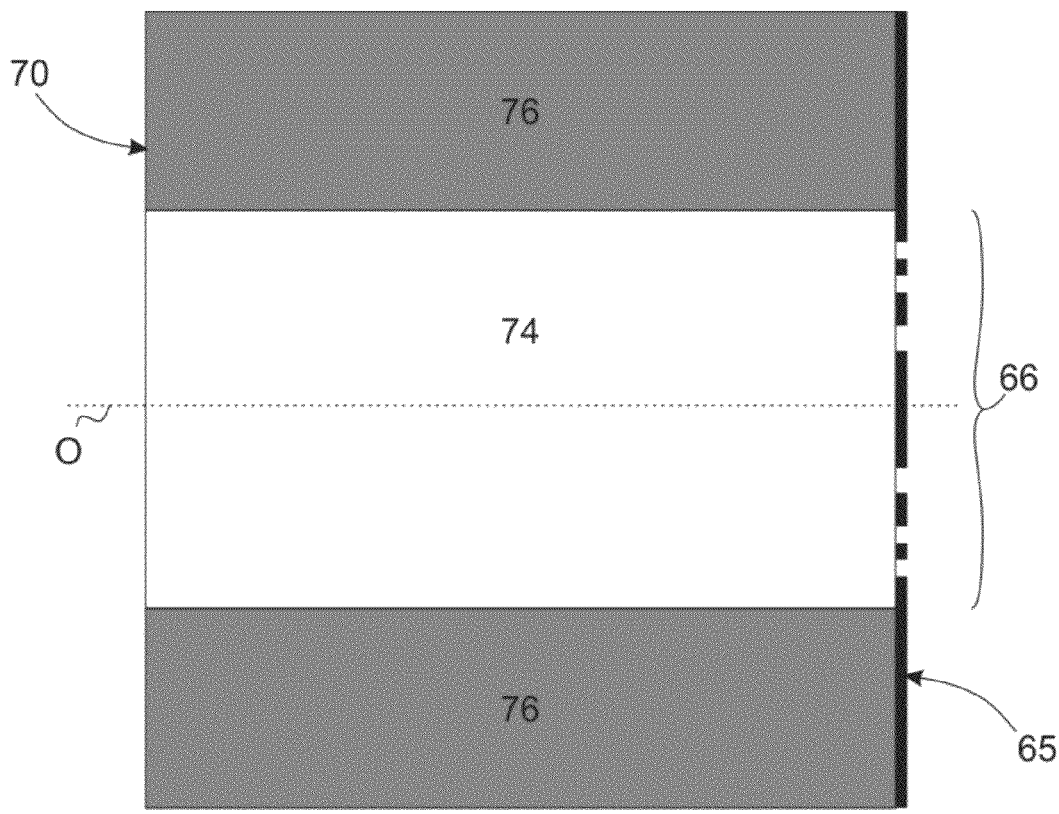
FIG. 14 shows a binary mask super-oscillatory lens that has been fabricated directly onto the end face of an optical fiber.

FIG. 14 shows a structured metal layer 66 forming a binary mask super-oscillatory lens that has been fabricated directly onto the end face 65 of an optical fiber 70 as an alternative to free-space coupling of the incident beam into the super-oscillatory lens. In other words, the end face 65 of the fiber 70 effectively forms the substrate as described in relation to FIG. 7a and the optical axis of the super-oscillatory lens is aligned with the optical axis O of the fiber. The optical fiber 70 illustrated has a waveguiding core 74 in which the incident light beam propagates surrounded by a cladding region 76. The optical fiber could be single mode or multi-mode. Other more specialized forms of optical fiber could also be used, e.g. incorporating multiple cores or multiple cladding regions. Polarization maintaining fiber could also be used.

The super-oscillatory lens brings the incident light coupled through the fiber core 74 to a focus in the same manner as described further above for the free-space coupled device.

A super-oscillatory lens positioned directly on the output of an optical fiber or other waveguide can act to convert light propagating in the waveguide into a focus without the need for external devices or the complex alignment of a waveguide to a separate lens. The manufacture can be done by directly depositing and patterning a metal film on the waveguide output facet, or by manufacturing the super-oscillatory lens on a thin substrate which could be cemented or otherwise fixed to the output facet of the waveguide. The same approach could be used to fabricate a super-oscillatory lens on the end facet of other types of waveguide, for example on the side face of a semiconductor laser structure or the end face of a planar waveguide such as in a lithium niobate structure.

REFERENCES

1. U.S. Pat. No. 5,105,305 (Betzig & Trautman)
2. Hecht, B., et al., Scanning near-field optical microscopy with aperture probes: Fundamentals and applications. Journal of Chemical Physics, 2000. 112(18): p. 7761-7774.
3. WO2008/009931 (Zheludev et al)
4. Huang, F. M. and Zheludev, N. I., Super-resolution without Evanescent Waves. Nano Letters, vol. 9(3), p 1249-1254, 30 Jan. 2009 http://pubs.acs.org/doi/abs/10.1021/nl9002014
5. O'Shea, D. C., et al., Diffractive Optics: Design, Fabrication and Test. 2004: SPIE, p. 39-44.
6. Robinson, J. and Y. Rahmat-Samii, Particle swarm optimization in electromagnetics. IEEE Transactions on Antennas and Propagation, 2004. 52(2): p. 397-407.
7. Kennedy, J. and R. Eberhart, Particle swarm optimization. 1995 IEEE International Conference on Neural Networks Proceedings, Vols 1-6, 1995: p. 1942-1948.
8. Jin, N. B. and Y. Rahmat-Samii, Advances in particle swarm optimization for antenna designs: Real-number, binary, single-objective and multiobjective implementations. IEEE Transactions on Antennas and Propagation, 2007. 55(3): p. 556-567.
9. Baumgartl et al, Applied Physics Letters 98, 181109 (2011)
10. Mazilu, et al, Opt. Exp., 19(2) 933 (2011)

What is claimed is:

1. An imaging apparatus comprising:
a light source operable to generate a light beam having one or more wavelength components;
a super-oscillatory lens arranged to receive the light beam from the light source, the lens having a pre-defined pattern to spatially modulate the light beam in amplitude and/or phase so that it focuses the light beam to a focus at a first focal point in a focal plane, the first focal point having an intensity profile in the focal plane that has a full width half maximum of less than half the wavelength;
collection optics arranged to image the first focal point to a second focal point conjugate to the first focal point;
a sample holder on which an object for imaging can be arranged;
a positioning apparatus operable to move the first focal point relative to the sample holder; and
a detector arranged to collect light from a collection region centered on the second focal point.

2. The imaging apparatus of claim 1, wherein the collection region is sized to collect at least a substantial part of the light from the second focal point.

3. The imaging apparatus of claim 1, wherein the collection region is an area having a dimension substantially less than the full width half maximum of the second focal point to collect only a part of the light from the second focal point.

4. The apparatus of claim 1, further comprising an image processing unit operable to assemble an image of the object from an array of picture elements, each picture element having a signal value based on light detected by the detector in one of the collection regions.

5. The apparatus of claim 1, wherein the super-oscillatory lens is formed at least in part from a binary mask which is generally opaque but is structured with a pre-defined pattern of optically transparent apertures to spatially modulate the light beam in amplitude.

6. The apparatus of claim 5, wherein the optically transparent apertures comprise a plurality of concentric rings.

7. The apparatus of claim 5, wherein the optically transparent apertures comprise a plurality of holes.

8. The apparatus of claim 5, wherein the super-oscillatory lens additionally includes a spatial light modulator arranged adjacent to the binary mask and operable to spatially modulate the light beam in phase and/or amplitude.

9. The apparatus of claim 1, wherein the super-oscillatory lens is formed at least in part from a spatial light modulator which is programmable to provide a pre-defined spatial modulation of the light beam in phase and/or amplitude.

10. The apparatus of claim 1, wherein the detector is an array detector made up of a two-dimensional array of detector elements, the detector elements having light-sensitive areas which are substantially smaller than the focus at the second focal point.

11. The apparatus of claim 1, wherein the pre-defined pattern focuses the light beam to create further focuses at further first focal points having full width half maxima of less than half the wavelength, wherein the collection optics also focus these further first focal points to respective further second focal points conjugate to the respective further first focal points, and wherein the array detector also collects light from further collection regions centered on the further second focal points.

12. An imaging method comprising:
providing an object to be imaged;
providing a light source operable to generate a light beam having one or more wavelength components;
arranging a super-oscillatory lens to receive the light beam from the light source, the lens having a pre-defined pattern to spatially modulate the light beam in amplitude and/or phase so that it focuses the light beam to a focus at a first focal point in a focal plane, the first focal point having an intensity profile in the focal plane that has a full width half maximum of less than half the wavelength;
activating the light beam to use the focus at the first focal point to probe a desired location on or in the object;
arranging collection optics to image the first focal point to a second focal point conjugate to the first focal point;
scanning the first focal point over the object to probe the surface at a plurality of locations; and
collecting light with a detector from a collection region centered on the second focal point.

13. An optical memory reading apparatus comprising:
a light source operable to generate a light beam having one or more wavelength components;
a super-oscillatory lens arranged to receive the light beam from the light source, the lens having a pre-defined pattern to spatially modulate the light beam in amplitude and/or phase so that it focuses the light beam to a focus at a first focal point in a focal plane, the first focal point having an intensity profile in the focal plane that has a full width half maximum of less than half the wavelength;
collection optics arranged to image the first focal point to a second focal point conjugate to the first focal point;
an optical memory holder on which can be arranged an optical memory bearing data;
a positioning apparatus operable to move the first focal point relative to the optical memory holder;
a detector arranged to collect light from a collection region centered on the second focal point and to output a signal indicative of intensity of the collected light at a plurality of data-bearing locations on the optical memory; and
an image processor operable to digitize the signal thereby reading the data borne on the optical memory.

* * * * *